Patented Feb. 19, 1924.

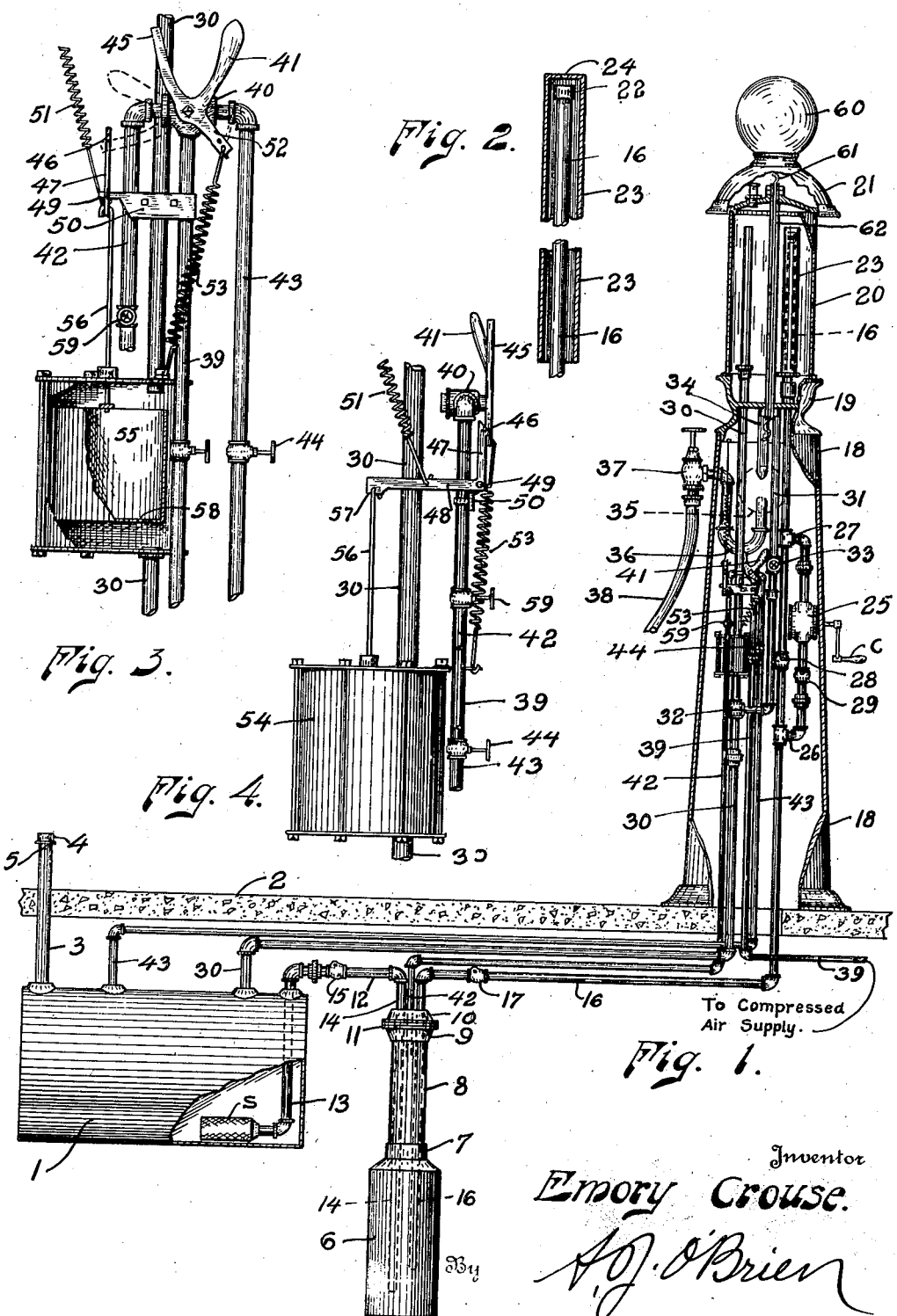

1,484,010

UNITED STATES PATENT OFFICE.

EMORY CROUSE, OF WICHITA, KANSAS.

LIQUID-DISPENSING SYSTEM.

Application filed January 16, 1922. Serial No. 529,773.

*To all whom it may concern:*

Be it known that I, EMORY CROUSE, a citizen of the United States, residing at Wichita, county of Sedgwick, and State of Kansas, have invented certain new and useful Improvements in Liquid-Dispensing Systems; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a system for dispensing liquids in measured quantities and has special reference to that type of apparatus employed for dispensing fuel for use in connection with internal combustion engines.

In this type of apparatus it is becoming the universal custom to elevate the liquid into a glass tank which is graduated into gallons and fractions of a gallon; the dispensing hose is connected to the bottom of the glass tank and the level of the liquid can be clearly seen at all times; by this means the purchaser can see exactly how much liquid fuel is delivered to him. In order to elevate the liquid into the tank several different expedients have been resorted to, the most obvious of which is to raise the same by means of a hand or power pump. It has also been suggested that the fuel be elevated by means of compressed air, and as a supply of compressed air is nearly always available at the filling stations, this method has been very extensively adopted.

Without attempting any detailed analysis of the prior art, I will proceed to describe my invention by reference to the accompanying drawing in which—

Fig. 1 shows my improved system with the part in assembled relation;

Fig. 2 is a detail view, partly in longitudinal section, showing the relationship of the pipes through which the liquid enters the tank;

Fig. 3 is a detail to an enlarged scale of the valve and automatic means for operating the same, with parts broken away; and Fig. 4 is a side elevation of the parts shown in Fig. 3.

The same reference numerals will be used to indicate the same parts throughout the various views.

1 is the main supply reservoir and is usually located beneath the ground level which is indicated by numeral 2. A pipe 3 extends upward and projects above the ground level as indicated in the drawing. The top of pipe 3 has a cap 4 which can be removed to permit the filling of tank 1. A vent opening 5 is also provided near the top of pipe 3. An auxiliary tank 6 which is preferably made seamless by having the joints welded electrically or by some other method, is placed below the level of the supply tank 1. The top of tank 6 terminates in a pipe coupling 7 which is welded thereto. A pipe 8 is threaded into the coupling 7 and leaded or otherwise treated so as to produce a perfectly tight joint between the two. The top of pipe 8 is provided with a cast iron head 9 which may be the lower part of an ordinary flange coupling and which cooperates with the corresponding part 10, the two being separated by a gasket 11 of "seiglite" or other suitable material, and held together by a plurality of bolts (not shown). In order to conduct liquid from the main reservoir 1 to the auxiliary tank 6, I provide a pipe connection which I have indicated as a whole by numeral 12; this pipe enters the reservoir 1 at the upper portion thereof and has a downwardly extending part 13 which terminates near the bottom of the reservoir in a strainer S. The other end of pipe 12 has a downwardly extending part 14 which passes through head 10, has an airtight connection therewith, and terminates near the bottom of auxiliary tank 6. Pipe 12 is provided with a check valve 15 which permits liquid to flow from the main reservoir 1 to the auxiliary tank 6 but not in the opposite direction. A fill line 16 extends from a point inside of the auxiliary tank 6 above the lower end of pipe 14 and extends to the dispensing device which will be hereinafter described; this pipe is provided with a check valve 17 which permits the liquid fuel to flow from the auxiliary tank but prevents it from returning thereto.

Located above the ground level is my dispensing device which comprises a sheet metal housing 18 which is surmounted by a cast iron head 19 on which is supported a glass bowl 20 of proper length and diameter to properly handle five or ten gallons of fuel. Glass bowl 20 is surmounted by a crown 21. Fill pipe 16 extends vertically through housing 18, head 19 and terminates near the top of the glass bowl. The upper end of pipe 16 has a cap 22 and a plurality of openings, in its sides, located directly below said cap. An aluminum cover 23 surrounds the upper end of fill pipe 16. The upper end of cover 23 has a vent 24. The liquid which enters the glass bowl through pipe 16 flows downwardly between pipe 16 and the inner surface of cover 23 and enters the glass bowl near its bottom. Within the housing 18 is a rotary pump 25 of the type which forms the subject matter of my copending application, Serial No. 502,323, filed September 22, 1921. Pump 25 is connected to fill pipe 16 at two spaced points 26 and 27, a check valve 28 being provided in fill pipe 16 between said points. Between pump 25 and the point of connection 26, I provide a check valve 29. Both valves 28 and 29 are so arranged that they permit liquid to flow upwardly but not in a downward direction.

An overflow pipe 30 extends from the five (5) gallon level of glass bowl 20 and has its lower end opening into the top of reservoir 1. When bowl 20 is being filled it is not essential that the operator should exercise any extraordinary care in shutting off the liquid at a certain level, as the excess will return to reservoir 1 through pipe 30 and automatically bring the liquid level to the exact point desired, which will naturally be the top of pipe 30. A pipe 31 extends from the bottom of glass bowl 20 and is connected to pipe 30 by means of a T 32; this pipe is provided with a globe valve 33 which can be manually or automatically opened and closed. At night, or whenever the operator leaves the station, he opens the valve 33 and permits all of the liquid in bowl 20 to flow back to reservior 1. Connected to the bottom of bowl 20 is another pipe 34 which connects with a special meter 35, the delivery side of which is connected by means of a return bend 36 with valve 37, which controls the flow of liquid to the hose 38. A pipe 39 extends from an air supply (not shown) to a rotary air control valve 40, a second pipe 42 connects valve 40 with the top of auxiliary tank 6, and a third pipe 43 connects the rotary air control valve 40 with the top of reservoir 1; this pipe serves to conduct the exhaust from auxiliary tank 6 to the reservoir.

Valve 40 is so arranged that when it is in the open position, it will make connection between air supply pipe 39 and pipe 42 which opens into the top of auxiliary tank 6; and when in closed position it will close line 39 and connect pipe 42 to exhaust pipe 43.

In order that the operator may be free to attend to other things while the dispensing tank 20 is being filled with liquid, I have provided means which will automatically close valve 40 when the liquid has reached the desired level. Valve 40 is a three-way valve and is so arranged that when it is in the position shown by full lines in Fig. 3, it will connect pipes 42 and 43, and when it is in the dotted line position it will connect pipes 39 and 42 and close the end of line 43.

Handle 41 is provided with a projecting part 45, which is adapted to engage a hook 46 on the upper end of arm 47 of bell crank 48, which is pivoted at 49 to the end of a bracket 50 which is clamped in place on pipes 42 and 43. A spring 51 serves to hold the bell crank 48 in operative position. Handle 41 is also supplied with another arm 52 which is biased to the full line position shown in Fig. 3 by means of a spring 53. Incorporated in the pipe 30 is a cylindrical chamber 54, within which a container 55 is freely suspended by means of a rod 56, the upper end of which is pivotally attached to the outer end of bell crank 48 at the point 57. Container 55 is so placed that the liquid which flows downwardly through overflow pipe 30 will enter the same and increase its weight to such an extent that it will overcome the tension of spring 51 and turn the bell crank 48 in a counter clock-wise direction about its pivot 49. Container 55 is provided in its bottom with a number of small openings 58 which will permit the liquid to escape from the container at a slow rate.

The operation of my dispensing system is as follows:

The main supply reservoir 1 is filled through pipe 3 after removing the cap or cover 4. As all of the pipes enter reservoir 1 at the top, it is evident that no liquid will flow out therefrom of its own accord until the siphon comprising pipes 12, 13 and 14 have been primed. In order to start the siphon working, the operator will turn valve 59 to shut position and thus close pipe 42. He will then operate rotary pump 25 by turning crank C, thereby producing a suction in auxiliary tank 6. Since pipe 42 is closed and pipe 16 is provided with check valves that prevent a fluid from flowing into tank 6, the reduced pressure therein will cause liquid to flow from reservoir 1 into it. After the gasoline has started to flow through the siphon into tank 6, it is not necessary to operate the pump any further unless he desires to operate the same for filling the glass bowl 20. By turning valve 59 to open position, the air in tank 6 will be permitted to flow out and through exhaust pipe 43 into the top of the main supply reservoir, and the siphon will continue to transfer liquid from reservoir 1 to tank 6 until the level in the two become the same. To transfer the liquid from auxiliary tank 6 to the glass bowl 20 by means of compressed air, it only necessary to move valve 40 to the position shown dotted in Fig. 3, in which position is will be held by hook 46. Compressed air will then flow from the supply through pipes 39 and 42 into the top of tank 6, and as check valve 15 prevents the liquid flowing back into reservoir 1, it will be forced through fill pipe 16 into the glass bowl 20. When the liquid in the container reaches the desired level, it will overflow into the top of pipe 30 and into container 55, and when sufficient liquid has accumulated in this container, its weight will overcome the tension of spring 51 and rotate the bell crank sufficiently to allow hook 46 to release arm 45, when spring 53 will immediately move the valve into the full line or closed position (Fig. 3); this permits the air in tank 6 to flow through pipe 42 and exhaust pipe 43 into reservoir 1, and allows the siphon to operate and transfer liquid from the supply reservoir to the auxiliary tank.

It will be noted that pipe 14 extends lower down into tank 6 than pipe 16; the reason for this is that sufficient liquid cannot be removed from tank 6 to permit the lower end of pipe 14 to become uncovered; by this means air cannot enter pipe 14 and the siphon will remain operative as long as there is sufficient liquid in the main supply reservoir to cover the lower end of pipe 14.

At the top of the cap 21, I provide a glass globe 60, within which is placed an electric lamp (not shown) to which current is supplied by means of wires 61, which pass through the tubular clamping member 62.

From the above it will appear that I have provided a dispensing system that can be operated by hand or by compressed air, and that is provided with means for automatically shutting off the air when the liquid has reached the desired level in the container.

Having now described my invention, what I claim as new is—

1. In dispensing apparatus of the class described, the combination of a supply tank, a container, a fill pipe extending from said tank to said container, an overflow pipe extending upwardly in said container, an air control valve, a vent pipe connected with the tank and with said valve, an air supply pipe connected with the valve, said valve having an exhaust port and also having means whereby it will connect the air supply pipe to the vent pipe, close either the air pipe or the exhaust and for connecting the vent pipe to the exhaust while the air supply pipe is closed, means whereby said air control valve is held in the position in which the air supply is connected to the vent pipe, and means operated by liquid flowing through the overflow pipe for automatically closing said air supply pipe and connecting said vent pipe with said exhaust when the liquid in the container overflows into the overflow pipe.

2. In a dispensing apparatus of the class described, a main supply reservoir, an auxiliary tank located below the reservoir, a siphon connecting said reservoir and said tank and arranged to transfer liquid from the former to the latter, a dispensing head comprising a stand, a measuring bowl supported thereon, a fill pipe extending from said auxiliary tank to said measuring bowl, an overflow pipe extending from near the top of said bowl to the supply reservoir, a vent pipe extending from the top of the auxiliary tank to the dispensing stand, a rotary air control valve, an air supply pipe connected to said valve, an exhaust pipe connecting said valve to the main supply reservoir, said valve having means whereby it will connect the air supply pipe to the vent pipe, close either the air pipe or the exhaust pipe, and for connecting the vent pipe to the exhaust pipe while the air supply is closed, means whereby said air control valve is held in the position in which the air supply is connected to the vent pipe, and means operated by liquid flowing through the overflow pipe for automatically closing said air supply pipe and connecting said vent pipe to said exhaust pipe when the liquid in the dispensing tank overflows into the overflow pipe.

3. In dispensing apparatus of the class described, the combination of a main supply reservoir, an auxiliary tank located below the reservoir, an operative connection between said reservoir and said tank for transferring liquid from the reservoir to the tank, a measuring bowl, a fill pipe extending from said auxiliary tank to said bowl, an overflow pipe extending upwardly into said bowl, an air control valve, a third pipe connecting said auxiliary tank with said valve for alternately venting said tank and supplying air under pressure thereto, an air supply pipe connected to said valve, the said valve having an exhaust port and also having means whereby it will connect the air supply pipe with said third pipe, close either the air supply pipe or the exhaust port and for connecting the third pipe to the exhaust while the air supply pipe is closed, means whereby said control valve is held in the position in which the air supply pipe is connected with the third pipe, and means operated by liquid from the overflow pipe for automatically closing said supply pipe and connecting said third pipe to said exhaust when the liquid in the measuring bowl overflows into the overflow pipe.

In testimony whereof I affix my signature.

EMORY CROUSE.